US009928515B2

(12) United States Patent
Carvalho et al.

(10) Patent No.: US 9,928,515 B2
(45) Date of Patent: Mar. 27, 2018

(54) SYSTEM AND METHOD FOR COMPETITIVE PRODUCT ASSORTMENT

(71) Applicant: HOME DEPOT PRODUCT AUTHORITY, LLC, Atlanta, GA (US)

(72) Inventors: Rodrigo Pierzchalski Carvalho, Atlanta, GA (US); Hajin Choi, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 4 days.

(21) Appl. No.: 13/841,322

(22) Filed: Mar. 15, 2013

(65) Prior Publication Data

US 2014/0136283 A1    May 15, 2014

Related U.S. Application Data

(60) Provisional application No. 61/727,061, filed on Nov. 15, 2012.

(51) Int. Cl.
*G06Q 10/00* (2012.01)
*G06Q 30/00* (2012.01)
*G06Q 30/02* (2012.01)

(52) U.S. Cl.
CPC ................ *G06Q 30/0201* (2013.01)

(58) Field of Classification Search
CPC ................................. G06Q 30/0201
USPC ...................................... 705/7.32
See application file for complete search history.

(56) References Cited

U.S. PATENT DOCUMENTS

| | | | |
|---|---|---|---|
| 4,996,642 A | 2/1991 | Hey | |
| 6,041,311 A | 3/2000 | Chislenko et al. | |
| 6,085,186 A | 7/2000 | Christianson et al. | |
| 6,606,625 B1 | 8/2003 | Muslea et al. | |
| 6,728,706 B2 | 4/2004 | Aggarwal et al. | |
| 7,117,163 B1 | 10/2006 | Iyer et al. | |
| 7,519,621 B2 | 4/2009 | Harik | |
| 7,702,700 B2 | 4/2010 | Lee et al. | |
| 7,970,713 B1 | 6/2011 | Gorelik et al. | |
| 8,041,588 B2 * | 10/2011 | Gilbert | G06F 3/04817 705/7.11 |
| 8,126,779 B2 | 2/2012 | Wanker | |
| 8,140,381 B1 | 3/2012 | Wu et al. | |
| 8,165,925 B2 | 4/2012 | Vallaya et al. | |

(Continued)

FOREIGN PATENT DOCUMENTS

WO    WO2010/104619    9/2010

OTHER PUBLICATIONS

Office Action dated Dec. 23, 2014, issued in U.S. Appl. No. 13/841,136.

(Continued)

*Primary Examiner* — Sujay Koneru
(74) *Attorney, Agent, or Firm* — Greenberg Traurig, LLP

(57) ABSTRACT

A product assortment system includes a crawler obtaining product information from one or more domains and storing the product information in a database. A user interface determines one or more product categories associated with one or more products of a customer. A keyword module determines criteria for associating one or more products of one or more competitors with the product categories. The user interface generates a display indicating overlap of the one or more products of the customer with the one or more products of the competitors.

24 Claims, 4 Drawing Sheets

(56) References Cited

U.S. PATENT DOCUMENTS

| | | | |
|---|---|---|---|
| 8,386,298 B2 | 2/2013 | Bai et al. | |
| 8,719,142 B1 | 5/2014 | Odom | |
| 8,818,838 B1* | 8/2014 | Sharma | 705/7.29 |
| 9,223,871 B2 | 12/2015 | Mallapragada | |
| 2003/0110066 A1 | 6/2003 | Walser et al. | |
| 2003/0171978 A1* | 9/2003 | Jenkins et al. | 705/10 |
| 2003/0177103 A1 | 9/2003 | Ivanov et al. | |
| 2004/0143508 A1 | 7/2004 | Bohn et al. | |
| 2004/0267762 A1 | 12/2004 | Tunning et al. | |
| 2006/0069585 A1* | 3/2006 | Springfield | G06Q 30/0201 705/7.29 |
| 2007/0038620 A1 | 2/2007 | Ka et al. | |
| 2007/0130090 A1* | 6/2007 | Staib et al. | 705/400 |
| 2007/0226082 A1 | 9/2007 | Leal | |
| 2007/0244883 A1 | 10/2007 | Bessieres et al. | |
| 2007/0299743 A1 | 12/2007 | Staib | |
| 2008/0046316 A1 | 2/2008 | Shah et al. | |
| 2008/0294996 A1 | 11/2008 | Hunt et al. | |
| 2008/0313165 A1 | 12/2008 | Wu | |
| 2009/0125549 A1 | 5/2009 | Li | |
| 2009/0144101 A1 | 6/2009 | Malov | |
| 2010/0010273 A1 | 1/2010 | Belfadhel et al. | |
| 2010/0083270 A1 | 4/2010 | Kline et al. | |
| 2010/0306031 A1* | 12/2010 | McCauley et al. | 705/10 |
| 2011/0010273 A1* | 1/2011 | Lee | 705/27.2 |
| 2011/0040611 A1 | 2/2011 | Simmons et al. | |
| 2011/0106581 A1* | 5/2011 | Rohrbasser et al. | 705/7.29 |
| 2011/0106851 A1 | 5/2011 | Swartz | |
| 2011/0153385 A1 | 6/2011 | Bateni et al. | |
| 2011/0191181 A1* | 8/2011 | Blackhurst et al. | 705/14.53 |
| 2011/0209048 A1 | 8/2011 | Scott et al. | |
| 2011/0213644 A1 | 9/2011 | Phene | |
| 2011/0270628 A1 | 11/2011 | Mital et al. | |
| 2011/0320478 A1 | 12/2011 | Carlson et al. | |
| 2012/0046998 A1 | 2/2012 | Staib et al. | |
| 2012/0203760 A1 | 8/2012 | Abraham et al. | |
| 2012/0259891 A1 | 10/2012 | Edoja | |
| 2012/0284113 A1 | 11/2012 | Pollak | |
| 2012/0296792 A1 | 11/2012 | Gindlesperger | |
| 2012/0330934 A1 | 12/2012 | Duboue et al. | |
| 2013/0166348 A1* | 6/2013 | Scotto | 705/7.29 |
| 2013/0275292 A1 | 10/2013 | Cappucci et al. | |
| 2014/0074591 A1* | 3/2014 | Allen | G06Q 30/0244 705/14.43 |
| 2014/0108308 A1 | 4/2014 | Stout et al. | |
| 2014/0136278 A1 | 5/2014 | Carvalho | |
| 2014/0136285 A1 | 5/2014 | Carvalho | |
| 2014/0136549 A1 | 5/2014 | Mallapragada et al. | |
| 2014/0149183 A1 | 5/2014 | Liu et al. | |
| 2014/0379535 A1* | 12/2014 | Briet et al. | 705/28 |

OTHER PUBLICATIONS

Response to Office Action dated Jun. 23, 2015, filed in U.S. Appl. No. 13/841,136.
Final Office Action dated Jul. 10, 2015, issued in U.S. Appl. No. 13/841,136.
Office Action dated Jan. 16, 2015, issued in U.S. Appl. No. 13/837,644.
Response to Office Action dated Jul. 16, 2015, filed in U.S. Appl. No. 13/837,644.
Final Office Action dated Sep. 25, 2015, issued in U.S. Appl. No. 13/837,644.
Kushmerick, N.: "Wrapper Induction for Information Extraction", Ph.D. Dissertation, University of Washington, (1997), pp. 1-264.
Kushmerick, N. et al.: "Wrapper Induction for Information Extraction", Int. Joint Conf. AI., (2007), 7 pages.
Kushmerick, N. et al.: "The Wrapper Induction Environment", Proceedings on the Workshop on Software Tools for Developing Agents (AAAI), (1998), pp. 131-132.
Qu, H.: "Wrapper Induction: Construct wrappers automatically to extract information from web sources", CMPT 882 Presentation, (Mar. 28, 2001), 4 pages.
Examiner's Report dated Apr. 9, 2015, issued in corresponding Canadian Patent Application No. 2833356.
Notice of Allowance dated Jul. 27, 2015, issued in U.S. Appl. No. 13/837,961.
Office Action dated Nov. 19, 2014, issued in U.S. Appl. No. 13/838,195.
Response to Office Action dated May 19, 2015, filed in U.S. Appl. No. 13/838,195.
Final Office Action dated Jun. 18, 2015, issued in U.S. Appl. No. 13/838,195.
Response to Final Office Action dated Dec. 17, 2015, filed in U.S. Appl. No. 13/838,195.
Office Action dated Jan. 13, 2016, issued in U.S. Appl. No. 13/838,195.
Office Action dated Jan. 30, 2015, issued in U.S. Appl. No. 13/841,487.
Response to Office Action dated Jul. 30, 2015, filed in U.S. Appl. No. 13/841,487.
Final Office Action dated Oct. 29, 2015, issued in U.S. Appl. No. 13/841,487.
Office Action dated Jan. 22, 2015, issued in U.S. Appl. No. 13/841,629.
Response to Office Action dated Jul. 22, 2015, filed in U.S. Appl. No. 13/841,629.
Final Office Action dated Aug. 11, 2015, issued in U.S. Appl. No. 13/841,629.
Response to Final Office Action dated Jan. 11, 2016, filed in U.S. Appl. No. 13/841,629.
Office Action Received in Canadian Counterpart Application No. 2,833,502, dated Nov. 7, 2016 (6 pages).
Office Action received in Mexican Counterpart Application No. MX/a/2013/013344 dated Oct. 7, 2016 (8 pages).
Office Action received in Mexican Counterpart Application No. MX/a/2013013344 dated Apr. 12, 2017, 7 pgs.

* cited by examiner

SYSTEM AND METHOD FOR COMPETITIVE PRODUCT ASSORTMENT

CROSS REFERENCE TO RELATED APPLICATION

This application claims priority to U.S. Provisional Patent Application No. 61/727,061, filed Nov. 15, 2012, and entitled "SYSTEM AND METHOD FOR COMPETITIVE PRODUCT ASSORTMENT," which is hereby incorporated by reference in its entirety. This application is also related to commonly assigned U.S. patent application Ser. No. 13/837,644, filed Mar. 15, 2013, and entitled "SYSTEM AND METHOD FOR AUTOMATIC WRAPPER INDUCTION BY APPLYING FILTERS," U.S. patent application Ser. No. 13/837,961, filed Mar. 15, 2013, and entitled "SYSTEM AND METHOD FOR AUTOMATIC WRAPPER INDUCTION USING TARGET STRINGS," and U.S. patent application Ser. No. 13/838,195, filed Mar. 15, 2013, and entitled "SYSTEM AND METHOD FOR AUTOMATIC PRODUCT MATCHING," the disclosures of which are incorporated by reference in their entirety. Copies of U.S. patent application Ser. Nos. 13/837,644, 13/837,961, and 13/838,195 are attached hereto as Appendices A, B, and C, respectively.

TECHNICAL FIELD

This disclosure relates generally to the field of competitive intelligence and, particularly, to product assortment in the retail industry.

BACKGROUND

Competitive intelligence, as it relates to product assortment has been an important aspect of the retail business for decades. Today, consumers have tools that allow them to quickly research products across thousands of retailers. To be competitive in the retail industry, it is important that retailers have a comprehensive assortment of products for their store and for the product categories that the retailer cares about.

Conventionally, to determine what products retailers are carrying, websites associated with each of the retailers need to be manually browsed. However, many retailers carry a very large number of products on their catalog, often times in excess of 100,000 different stock keeping units (SKUs) associated with different products. Each SKU is often sold by many different retailers at different prices. Thus, this method is time consuming, not comprehensive, and leaves room for error. To this end, there is a need for improved systems and methods for retailers to identify products that their competitors carry and that they are not.

SUMMARY OF THE DISCLOSURE

Embodiments as described herein relate to competitive intelligence associated with product assortment for a retailer in the retail industry. In one implementation, a competitive product assortment system may determine web pages for competitors that include products relevant to a customer of the system. One example of such a customer may be a business entity. One example of a business entity can be a retailer. This retailer maybe selling a product and is interested in information relating to that product or similar ones from its competitors, including known and unknown competitors. These competitors may have a presence on the Internet.

The system may be configured to pull information associated with products or product types from an unbound number of domains on the Internet. Examples of information associated with a product may include name, description, product attributes, SKU, price, image, etc. These competitors as well as their domains and websites may or may not be known by a customer requesting the information.

In this disclosure, the term "domain" is used in the context of the hierarchical Domain Name System (DNS) of the Internet. Those skilled in the art appreciate that the DNS refers to a hierarchical naming system for computers or any resource connected to the Internet. A network that is registered with the DNS has a domain name under which a collection of network devices are organized. Today, there are hundreds of millions of websites with domain names and content on them. As the number of websites continues to grow, pulling information associated with a product or products from an unbound number of domains on the Internet can be a very complex, tedious, and complicated process.

Embodiments disclosed herein can leverage wrapper induction and wrapper infection methodologies disclosed in Appendix A and Appendix B attached herewith to automate a data mining process across unbounded domains. Additionally, because each competitor may describe or define a product in different ways, it may be desirable or necessary to determine which products sold by different competitors refer to the same product. Embodiments disclosed herein can also leverage a novel approach disclosed in Appendix C attached herewith to match a product or product type of interest with product information crawled from the Internet. This matching process can help to ensure that any price or feature comparison made between a predefined product/product type and products/product types being sold by different competitors on the Internet are the same and/or relevant. Appendices A, B, and C are hereby incorporated by reference in their entireties.

In embodiments disclosed herein, a system is operable to obtain or otherwise gain knowledge on the products that competitors are selling and each competitor's pricing of the products. Different competitors may sell the same product, but may describe or define the product in different ways. In some embodiments, based on keywords pulled from a website where a product is being sold, the product may be assigned to a product category (e.g., LED TVs), a given brand (e.g., Sony®), a combination of brand and product category (e.g., Sony® LED TVs), etc.

The system can include a user interface through which a customer requesting competitive intelligence information from the system can view, for a given product category, brand, combination of brand and category, etc., what products that the customer's competitors are carrying, what products that the customer's competitors are carrying but the customer is not, etc.

In one embodiment, the user interface may provide a product assortment map that displays overlapping and/or unique products carried by a customer and their competitors. The product assortment map may be configured in various ways. For example, a product assortment map may include a plurality of boxes associated with different product categories (i.e. TVs) and/or a product subcategories (i.e. LED TVs). These boxes may have various sizes, colors, shades, or other indicators indicating a degree of competitiveness. As a specific example, a product assortment map may be implemented as a "heat map" with boxes associated with different product categories displayed in shades of red. The darker shade of red may be used to indicate that there is a higher overlap between products that competitors carry and the products that the retailer carries in that particular product category. The lighter shade of red may be used to indicate that there is a lower overlap between the products that competitors carry and products that the retailer carries in that particular product category.

As another example, the product assortment map may be configured as a Venn diagram, illustrating what products in a product group a customer's competitors carry, what products the customer carries, and where there is an overlap, if any. A user may select one of the portions of the Venn diagram on the user interface, and a table can be generated to show the products that are associated with the selected portion of the Venn diagram.

Embodiments disclosed herein can provide many advantages. For example, systems and methods described herein can enable retailers to quickly benchmark their product assortment against their competitors for each product category and, if desired, quickly identify new items to add to their store catalog.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions or rearrangements may be made within the scope of this disclosure, which includes all such substitutions, modifications, additions or rearrangements.

BRIEF DESCRIPTION OF THE DRAWINGS

The drawings accompanying and forming part of this specification are included to depict certain aspects of various embodiments. A clearer impression of these embodiments, and of the components and operation of systems provided with them, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Various features and advantageous the present disclosure are explained more fully with reference to the nonlimiting embodiments that are illustrated in the accompanying drawings and detailed in the following description. Descriptions of well-known starting materials, processing techniques, components and equipment are omitted so as not to unnecessarily obscure the present disclosure. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

Before discussing specific embodiments, a brief overview of the context of the disclosure may be helpful. Systems and methods described herein enable customers (e.g., retailers in merchandising) determine what products they desire to sell and the pricing of their products. An authorized user working for a retailer (a customer of the system) may be assigned to determine what products the retailer should be selling and at what price. Embodiments described herein can help a customer to determine what products that their competitors are carrying, what each competitor's pricing is for the products, whether there is an overlap of products between the customer and their competitors, and what degree of overlapping there is between the product offerings by the customer and their competitors.

Figure 1:
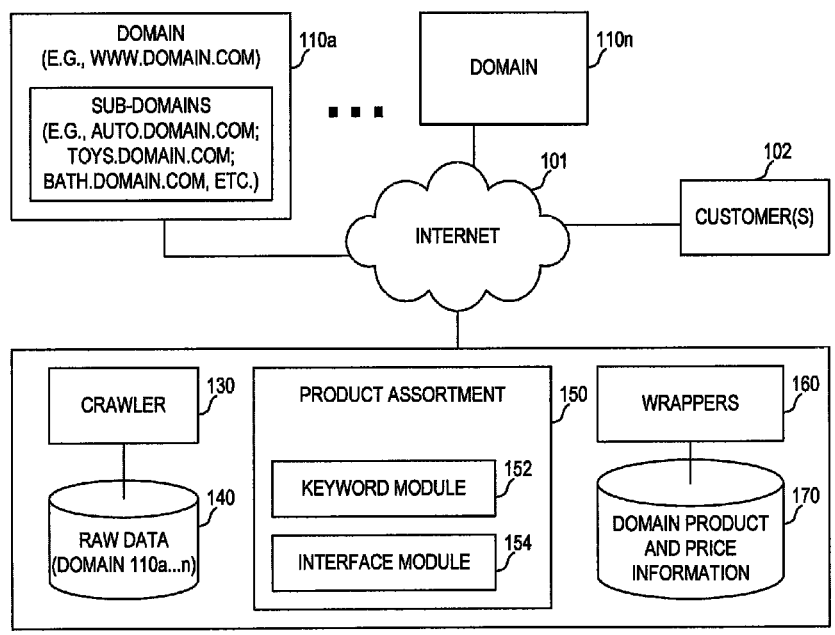
FIG. 1 depicts a block diagram of one embodiment of an architecture in which a competitive product assortment system may be implemented.

Turning now to FIG. 1, a block diagram illustrating an exemplary system 100 is shown. System 100 couples to a network such as the Internet 101 and has access to domains 110*a* . . . 110*n*. Each domain may have a common network name (domain name) under which a collection of network devices are organized (e.g., domain.com). Each domain may have one or more sub-domains (e.g., abc.domain.com, xyz.domain.com, etc.) according to the hierarchical Domain Name System (DNA) of the Internet. The collection of network devices in a domain may include one or more server machines hosting a website representing the domain (e.g., www.domain.com).

A website (also referred to as Web site, web site, or site) refers to a set of related web pages (also referred to as pages) containing content such as text, images, video, audio, etc. A website can be accessible via a network such as the Internet or a private local area network through an Internet address known as a Uniform Resource Locator (URL). All publicly accessible websites collectively constitute the World Wide Web.

Crawler 130 of system 100 may crawl the Internet 101 across domains 110*a*-110*n* for data and store them in raw data database 140. The data obtained by crawler 130 may be associated with retail products. Wrappers 160 may be generated using techniques disclosed in Appendix A and/or Appendix B to extract desired information, such as domain product and price information, from the raw data obtained by crawler 130. Other suitable wrapper generation techniques may also be used. The domain product and price information thus obtained may be stored at database 170.

System 100 may include product assortment component or system 150. Product assortment system 150 may be configured to determine a set of product categories and subcategories associated with SKUs (a type of product identifier) carried by a retailer. Other product identifiers may also be used. Product assortment system 150 may receive a set of SKUs associated with each product the retailer carries, and categories and/or subcategories associated with the SKU.

Customer 102 of system 100 may define, via a user interface provided by interface module 154, one or more keywords. Those skilled in the art will appreciate that customer 102 is representative of any and all individuals and entities alike that employ or otherwise consult system 100. Inputs provided by a customer at the front end (e.g., via a web browser running on a client device associated with the customer and implementing an instance of a web based user interface provided by interface module 154) may be communicated to a server machine running system 100 (or a portion thereof, e.g., component 150) at the back end and stored in a data store (not shown) accessible by a keyword module 152.

Keyword module 152 may be configured to receive customer-defined keywords identifying what competitors' products should be associated with which product category or sub category based on the data obtained from web crawler 130. In one embodiment, for a product to be included in a product category or subcategory, data obtained from a competitor's website for the same product should include one or more customer-defined keyword. For example, for a product to be included in a "SLR Camera" subcategory, the data associated with a product from a competitor should have the keywords: "SLR," "Camera," and "Digital." Keywords may also be used to exclude certain products or types of products. For example, for a product to be included in a "SLR Camera" subcategory, the data associated with a product from a competitor should not have any or all of the following keywords: "kit," "refactored," "refurbished," and "used."

Interface module 154 may be configured to display, for instance, to an authorized user of customer 102, what products the customer's competitors are carrying, products the customer is carrying, etc. In one embodiment, interface module 154 may provide a product assortment map that displays overlaps and unique products carried by the customer and their competitors. In one embodiment, interface module 154 may provide a Venn diagram illustrating what products in a product group that the customer's competitors carry, what products the customer carries, whether there is any overlap, and how much of an overlap there may be.

Figure 2:
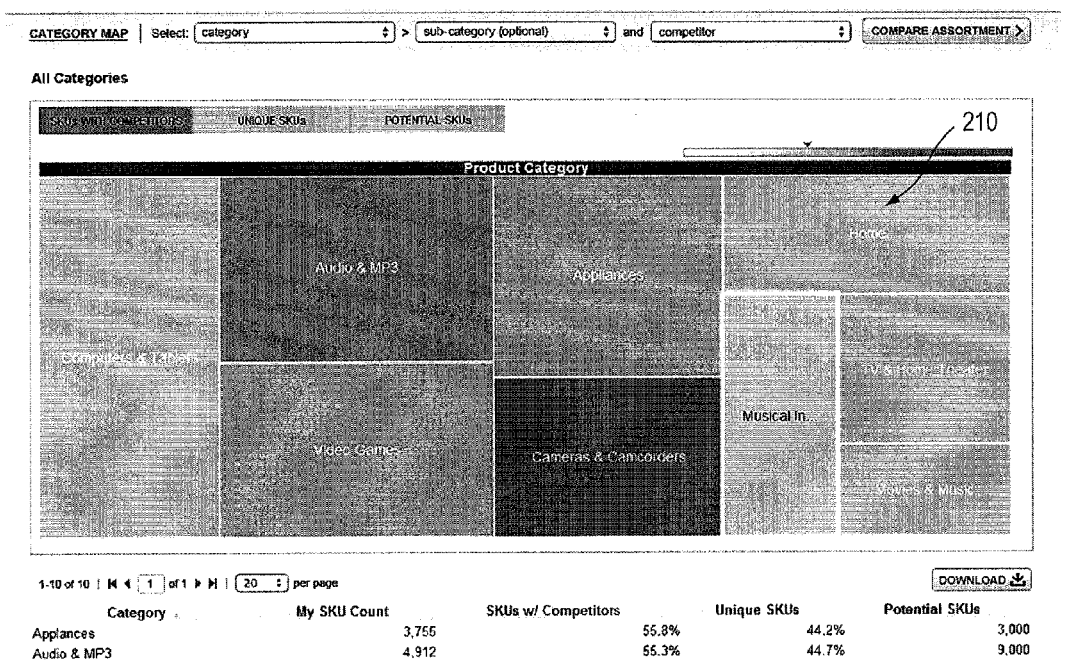
FIG. 2 depicts an example user interface of an embodiment of a competitive product assortment system.

FIG. 2 depicts one embodiment of a product assortment map 200 implemented as a heat map with boxes in various sizes and shades of a color. Product categories 210 of product assortment map 200 may be associated with different user defined product categories, such as computers and tablets, video games, appliances, etc.

Each of the different product categories 210 may be sized according to how many products the retailer sells for a respective category. A shade or darkness of each of the product categories 210 may be associated with an overlap between the products that a retailer carries for a product category and the products that competitors carry.

As depicted in FIG. 2, product category 210 associated with cameras and camcorders may have the highest overlap between products that a customer and their competitors sell in the cameras & camcorders product category.

Each of the product categories 210 may be selectable, and upon selecting a product category 210, subcategories of the selected product category 210 may be displayed. An example of subcategories associated with a selected product category is depicted in FIG. 3.

Figure 3:
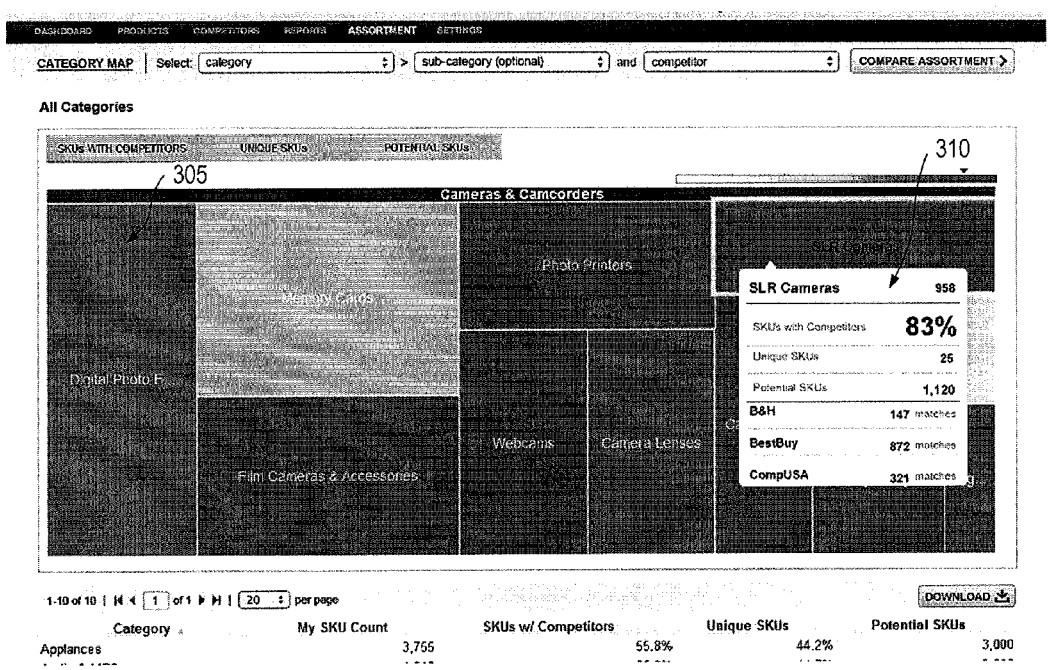
FIG. 3 depicts an example user interface of an embodiment of a competitive product assortment system.

FIG. 3 depicts an example of a product assortment map implemented as a heat map with boxes in various sizes and shades of a color indicating a plurality of subcategories 305 associated with a selected product category "Cameras & Camcorders." As illustrated in FIG. 3, each subcategory 305 may be associated with a different type of products in the selected product category. In this example, subcategories of the selected product category "Cameras & Camcorders" include memory cards, webcams, photo printers, SLR cameras, etc.

Each of the different product subcategories 305 may be sized according to how many products the customer sells for a respective subcategory. A shade or darkness of each of the product subcategories 305 may be associated with an overlap between the products that the customer carries and the products that their competitors carry in the particular subcategory.

Each subcategory 305 may be selectable by a user selecting, clicking, or hovering over a corresponding box or area. Upon selecting or hovering over subcategory 305, further information 310 associated with subcategory 305 may be displayed, as shown in FIG. 3. Further information 310 may include information associated with a name of the selected subcategory 305, the number of products carried by the retailer in selected subcategory 305, a percentage of products carried by the retailers that are also carried by competitors for selected subcategory 305, the number of products carried by the retailer in selected subcategory 305, a number of products carried by the retailer that are not carried by competitors for selected subcategory 305, and a number of products for selected subcategory 305 that are carried by selected competitors and the retailer.

Figure 4:
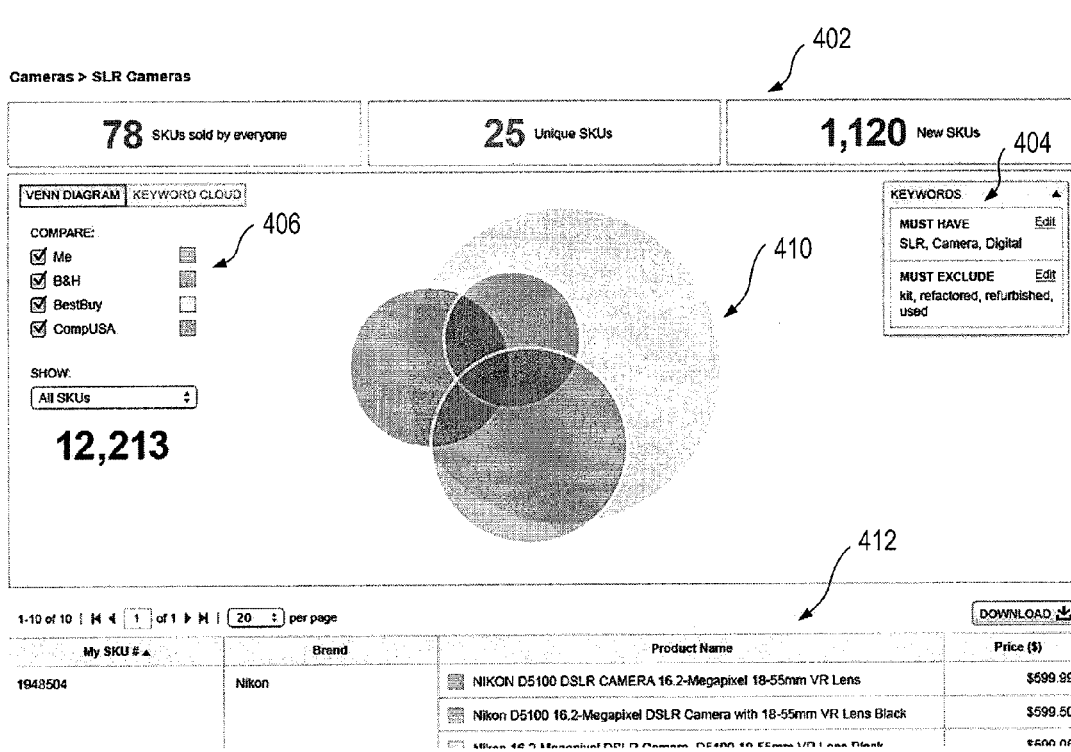
FIG. 4 depicts an example user interface of an embodiment of a competitive product assortment system.

FIG. 4 depicts an example of a product assortment map implemented as a Venn diagram or set diagram. Those skilled in the art can appreciate that a Venn diagram or set diagram refers to a diagram that shows all possible logical relations between sets of items. In this example, user interface 400 may include summary 402, keywords 404, filters 406, Venn diagram 410 and table 412.

Summary 402 may include data associated with what products are carried by each competitor and a customer, what products only the customer carries, a total number of products in a selected category or subcategory, new products that have been added to the category or subcategory, etc.

Keywords 404 may indicate inclusive keywords and exclusive keywords. Inclusive keywords may be used to indicate certain products should be included in a product category or subcategory. Exclusive keywords may be used to indicate certain products should be excluded from a product category or subcategory. Keywords 404 may be configured to allow an authorized user of the customer to edit what keywords a product in a product category or subcategory should or should not have.

Filters 406 may be configured to allow an authorized user of the customer to select different combinations of products carried by the customer and their competitors to view in Venn diagram 410.

As illustrated in FIG. 4, Venn diagram 410 may display, corresponding to a selection made via filters 406, all possible logical relations between products carried by the customer and their competitors. In this case, Venn diagram 410 shows all SLR digital cameras that are carried by the customer "Mobile Electronics" or "Me" and three other competitors and that do not include "kit," "refactored," "refurbished," or "used" SLR digital cameras. A user viewing Venn diagram 410 can readily determine what products they carry that their competitors also carry, as well as products that the customer may desire to carry.

One embodiment of user interface 400 may display how many products the customer carries and how many their competitors carry in the product category or subcategory. For example, user interface 400 may be configured to show that the customer carries twenty-five unique products that their competitors do not carry and/or that seventy-eight products are carried by each competitor and the customer.

In one embodiment, upon a user selecting a portion of Venn diagram 410, a table 412 may be generated to show the information associated with the products in the selected portion of Venn diagram 410. The information in table 412 may indicate the customer's SKU for a product, a brand name for the product, competitor's descriptions for the product, and competitor's prices for the product. Based on the information in table 412, the customer may determine possible keywords to include or not include for a product category or subcategory. Furthermore, the customer may determine additional brands, products, etc. that they desire to carry, pricing for a product based on a number of competitors carrying the product, etc.

Figure 5:
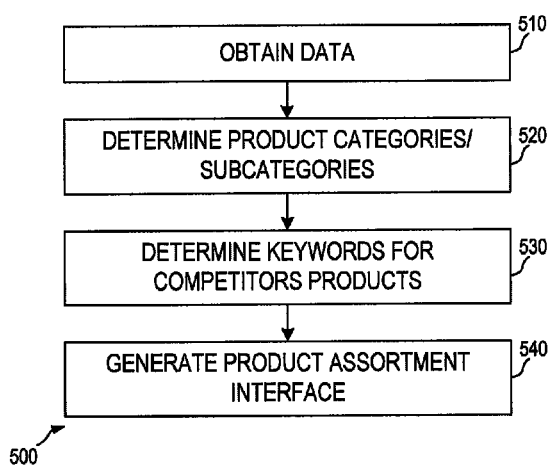
FIG. 5 depicts a flow chart illustrating operation of an example competitive product assortment system.

FIG. 5 depicts a flow chart 500 illustrating operation of an example competitive product assortment system. Those skilled in the art will appreciate that flow chart 500 is meant to be illustrative and not limiting.

At step 510, domain product and price information from an unbound number of domains may be obtained and stored in a database (e.g., database 170) as described above. Example data mining methods are provided in the attached Appendix A and Appendix B. The data thus obtained may be associated with retail products, such as the products name, attributes, description, pricing, etc.

At step 520, product categories and subcategories associated with product identifiers (e.g., SKUs) for a product carried by a customer may be determined. As described above, this step may involve an authorized user of the customer making a selection or entering product category information via a user interface provided by interface module 154.

At step 530, keywords identifying what competitors' products are to be associated with which product category or sub category may be determined. As described above, this step may involve an authorized user of a customer making a selection or entering keywords to include certain products in and/or exclude certain products from a product category and/or subcategory.

At step 540, based on the information from the above steps, an interface is generated (e.g., by interface module 154) to display, for example, what products a customer's competitors are carrying, products the customer is carrying, an overlap of the products, and what products only the customer is carrying. As described above, the interface may be configured to include a heat map or Venn diagram.

Although the present disclosure has been described in terms of specific embodiments, these embodiments are merely illustrative, and not restrictive. The description herein of illustrated embodiments, including the description in the Abstract and Summary, is not intended to be exhaustive or to limit the disclosure to the precise forms disclosed herein (and in particular, the inclusion of any particular embodiment, feature or function within the Abstract or Summary is not intended to limit the scope of the disclosure to such embodiments, features or functions). Rather, the description is intended to describe illustrative embodiments, features and functions in order to provide a person of ordinary skill in the art context to understand the present disclosure without limiting same to any particularly described embodiment, feature or function, including any such embodiment feature or function described in the Abstract or Summary. While specific embodiments are described herein for illustrative purposes only, various equivalent modifications are possible, as those skilled in the relevant art will recognize and appreciate. As indicated, these modifications may be made in light of the foregoing description of illustrated embodiments and are to be included within the spirit and scope of the disclosure. Thus, various changes and substitutions are intended in the foregoing disclosures, and it will be appreciated that in some instances some features of embodiments will be employed without a corresponding use of other features without departing from the scope and spirit as set forth. Therefore, many modifications may be made to adapt a particular situation or material.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein.

In the description herein, numerous specific details are provided, such as examples of components and/or methods, to provide a thorough understanding of described embodiments. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments. A person of ordinary skill in the art will recognize that additional embodiments are readily understandable from the disclosure.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the described embodiments.

It is also within the spirit and scope of the disclosure to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. Various embodiments may be implemented by using software programming or code in one or more general purpose digital computers, by using application specific integrated circuits, programmable logic devices, field programmable gate arrays, optical, chemical, biological, quantum or nanoengineered systems, or components and mechanisms may be used. In general, the functions of various embodiments can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

The invention claimed is:

1. A product assortment method, the method comprising:
obtaining, by a processor, product information from one or more domains and storing the product information in a database, the product information comprising (i) information concerning products that are by a customer, and (ii) information concerning products that are sold by the competitors of the customer;
determining, by a processor, one or more product categories associated with products sold by the customer;
determining, by a processor, criteria for associating the products sold by the competitors with the product categories; and
generating, by a processor, a user interface on a display diagrammatically indicating an overlap of the products sold by the customer with the products sold by the competitors of the customer, unique products of the customer, and unique products of the competitors of the customer, wherein the diagrammatic indication is organized according to the product categories;
wherein obtaining product information from one or more domains comprises crawling the Internet to obtain raw product information from the one or more domains and applying one or more wrappers to the raw data to automatically extract the product information from the raw data, wherein each of the one or more wrappers extracts a respective portion of the product information from the raw data;
wherein generating the display comprises displaying a heat map comprising shaded boxes, each associated with a product category, wherein a darker shade indicates a higher overlap of the products sold by the customer with the products sold by the competitors of the customer, and wherein a lighter shade indicates a lower overlap of the products sold by the customer with the products sold by the competitors of the customer;
wherein the shaded boxes of the heat map are sized according to a number of products sold by the customer in the categories associated with the shaded boxes.

2. The method of claim 1, wherein obtaining the product information comprises obtaining domain product and pricing from an unbound number of domains.

3. The method of claim 2, wherein determining the one or more product categories comprises determining product categories and subcategories associated with unique product identifiers for the one or more products carried by the customer.

4. The method of claim 3, wherein determining the criteria comprises determining keywords identifying what competitors' products are to be associated with which product category or subcategory.

5. The method of claim 1, wherein storing the product information comprises associating the product information with retail products, including at least one of a product name, product attribute, product description, or product pricing.

6. The method of claim 1, wherein determining the one or more product categories comprises receiving one or more selections or product category information from a user authorized by the customer.

7. The method of claim 1, wherein determining the criteria comprises receiving, via the user interface, one or more selections or keywords for at least one of including products in or excluding products from at least one of a product category or subcategory.

8. The method of claim 1, wherein generating the display comprises displaying a Venn diagram.

9. The method of claim 1, further comprising displaying, responsive to a user selection of a product category in the heat map, further information about the product category.

10. A system, comprising:
a memory;
a processor coupled to the memory, the processor configured to:
obtain product information from one or more domains and store the product information in a database, the product information comprising (i) information concerning products that are sold by a customer, and (ii) information concerning products that are sold by the competitors of the customer;
wherein obtaining product information from one or more domains comprises crawling the Internet to obtain raw product information from the one or more domains and applying one or more wrappers to the raw data to automatically extract the product information from the raw data, wherein each of the one or more wrappers extracts a respective portion of the product information from the raw data;
determine one or more product categories associated with products sold by the customer;
determine criteria for associating products sold by the competitors with the product categories; and
generate a user interface on a display that diagrammatically indicates an overlap of the products sold by the customer with the products sold by the competitors of the customer, unique products of the customer, and unique products of the competitors of the customer, wherein the diagrammatic indication is organized according to the product categories;
wherein the processor is configured to generate the display by displaying a heat map comprising shaded boxes, each associated with a product category, wherein a darker shade indicates a higher overlap of the products sold by the customer with the products sold by the competitors of the customer, and wherein a lighter shade indicates a lower overlap of the products sold by the customer with the products sold by the competitors of the customer;
wherein the shaded boxes of the heat map are sized according to a number of products sold by the customer in the categories associated with the shaded boxes.

11. The system of claim 10, wherein the processor is configured to obtain the product information by obtaining domain product and pricing from an unbound number of domains.

12. The system of claim 11, wherein the processor is configured to determine the one or more product categories by determining product categories and subcategories associated with unique product identifiers for the one or more products carried by the customer.

13. The system of claim 12, wherein the processor is configured to determine the criteria by determining keywords identifying what competitors' products are to be associated with which product category or subcategory.

14. The system of claim 10, wherein the processor is configured to store the product information by associating the product information with retail products, including at least one of a product name, product attribute, product description, or product pricing.

15. The system of claim 10, wherein the processor is configured to determine the one or more product categories by receiving one or more selections or product category information from a user authorized by the customer.

16. The system of claim 10, wherein the processor is configured to determine the criteria by receiving one or more selections or keywords for at least one of including products in or excluding products from at least one of a product category or subcategory.

17. The system of claim 10, wherein the processor is configured to display, responsive to a user selection of a product category in the heat map, further information about the product category.

18. A non-transitory computer-readable medium, comprising:
    code executable by a computer to obtain product information from one or more domains and store the product information in a database, the product information comprising (i) information concerning products that are sold by a customer, and (ii) information concerning products that are sold by the competitors of the customer;
    wherein obtaining product information from one or more domains comprises crawling the Internet to obtain raw product information from the one or more domains and applying one or more wrappers to the raw data to automatically extract the product information from the raw data, wherein each of the one or more wrappers extracts a respective portion of the product information from the raw data;
    code executable by a computer to determine one or more product categories associated with products sold by the customer;
    code executable by a computer to determine criteria for associating products sold by the competitors with the product categories; and
    code executable by a computer to generate a user interface on a display that diagrammatically indicates an overlap of the products sold by the customer with the products sold by the competitors of the customer, unique products of the customer, and unique products of the competitors of the customer, wherein the diagrammatic indication is organized according to the product categories;
    wherein the code executable by a computer to generate the display comprises code executable by a computer to display a heat map comprising shaded boxes, each associated with a product category, wherein a darker shade indicates a higher overlap of the products sold by the customer with the products sold by the competitors of the customer, and wherein a lighter shade indicates a lower overlap of the products sold by the customer with the products sold by the competitors of the customer;
    wherein the code executable by a computer to generate the display comprises code executable by a computer to display, responsive to a user selection of a product category in the heat map, further information about the product category.

19. The non-transitory computer-readable medium of claim 18, wherein the code executable by a computer to obtain the product information comprises code executable by a computer to obtain domain product and pricing from an unbound number of domains.

20. The non-transitory computer-readable medium of claim 19, wherein the code executable by a computer to determine the one or more product categories comprises code executable by a computer to determine product categories and subcategories associated with unique product identifiers for the one or more products carried by the customer.

21. The non-transitory computer-readable medium of claim 20, wherein the code executable by a computer to determine the criteria comprises code executable by a computer to determine keywords identifying what competitors' products are to be associated with which product category or subcategory.

22. The non-transitory computer-readable medium of claim 18, wherein the code executable by a computer to store the product information comprises code executable by a computer to associate the product information with retail products, including at least one of a product name, product attribute, product description, or product pricing.

23. The non-transitory computer-readable medium of claim 18, wherein the code executable by a computer to determine the one or more product categories comprises code executable by a computer to receive one or more selections or product category information from a user authorized by the customer.

24. The non-transitory computer-readable medium of claim 18, wherein the code executable by a computer to determine the criteria comprises code executable by a computer to receive one or more selections or keywords for at least one of including products in or excluding products from at least one of a product category or subcategory.

* * * * *